(No Model.) 3 Sheets—Sheet 1.
C. K. MARSHALL.
MACHINE FOR REMOVING LINT FROM COTTON SEED.
No. 431,949. Patented July 8, 1890.
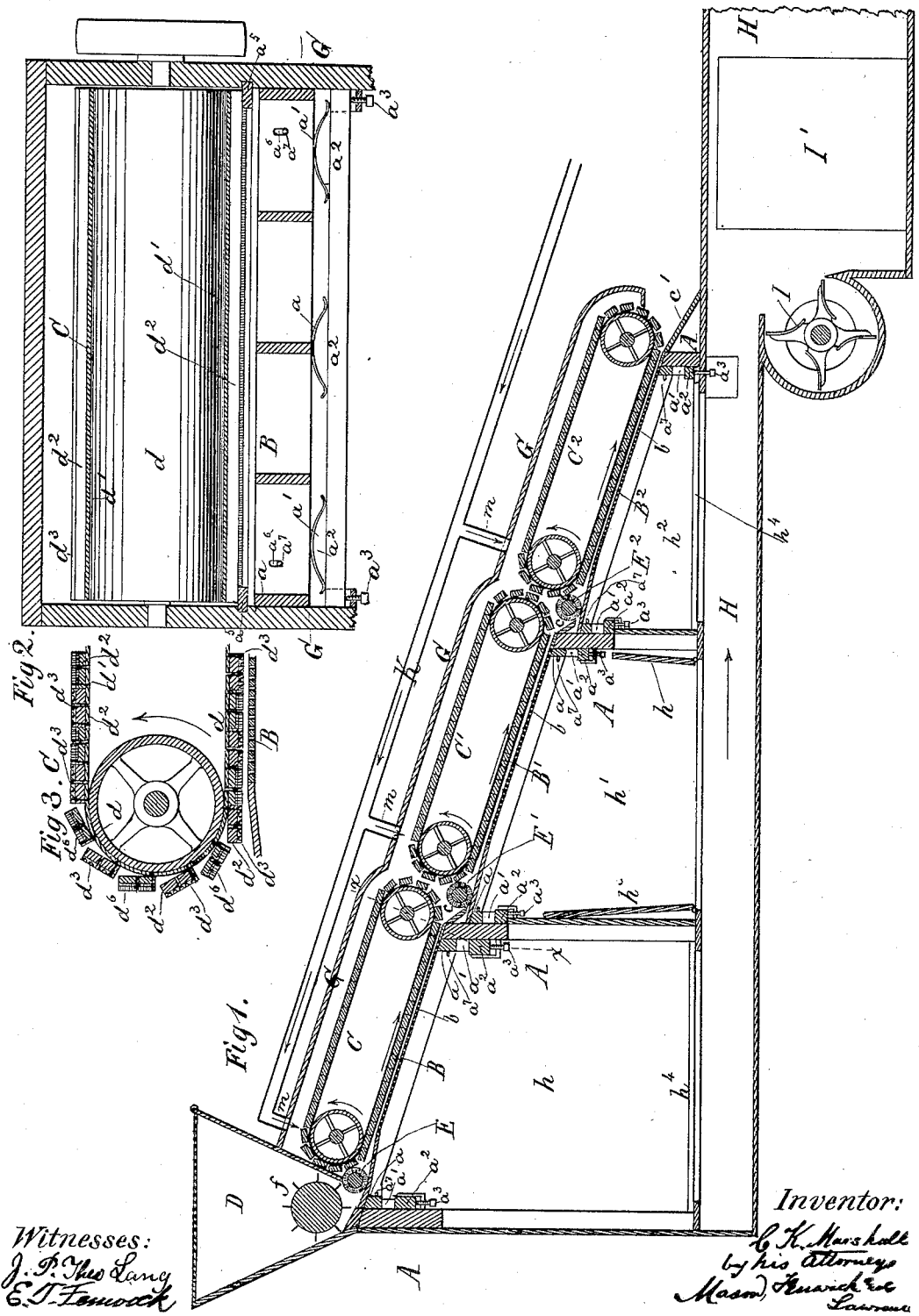
Witnesses:
J. P. Theo Lang
E. T. Fenwick
Inventor:
C. K. Marshall
by his Attorneys
Mason, Fenwick & Lawrence

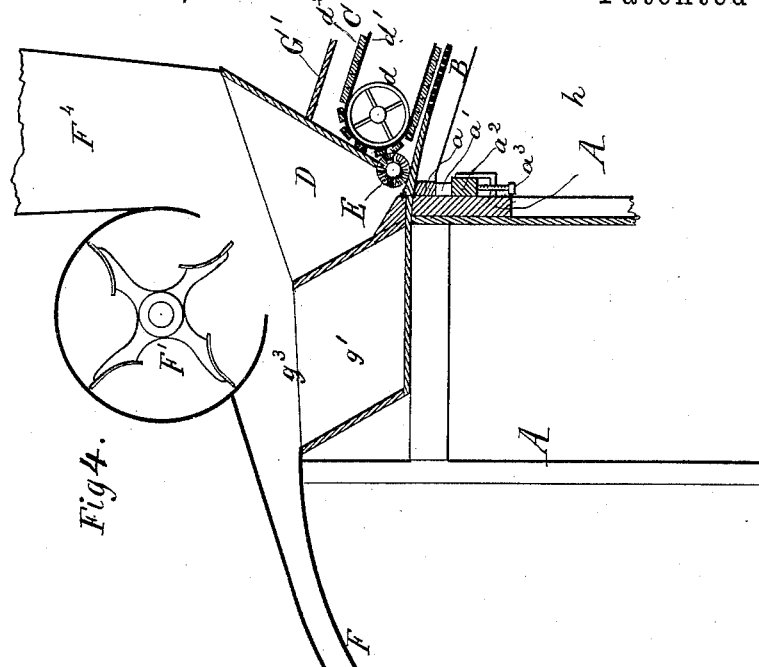
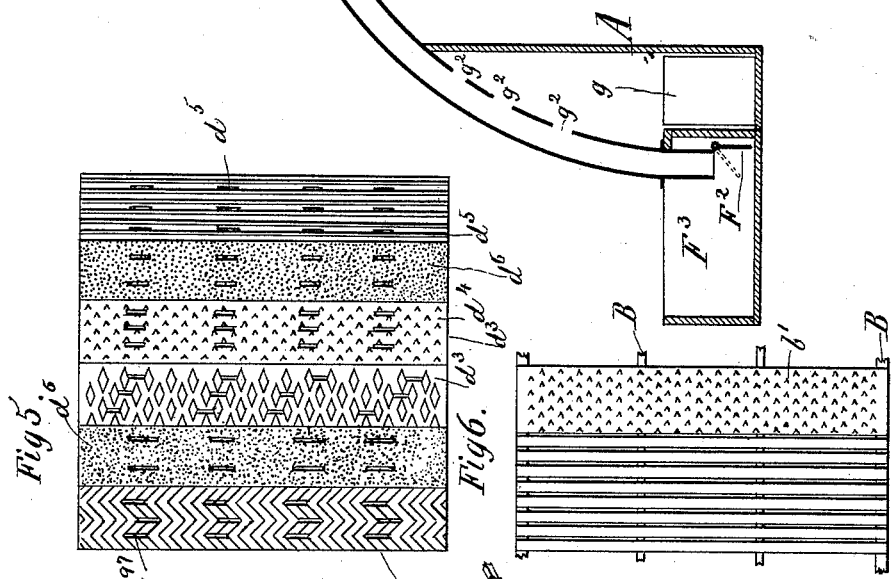
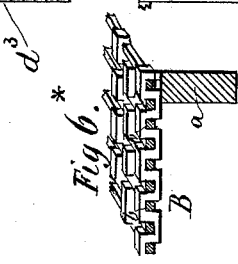

(No Model.) 3 Sheets—Sheet 3.
C. K. MARSHALL.
MACHINE FOR REMOVING LINT FROM COTTON SEED.
No. 431,949. Patented July 8, 1890.
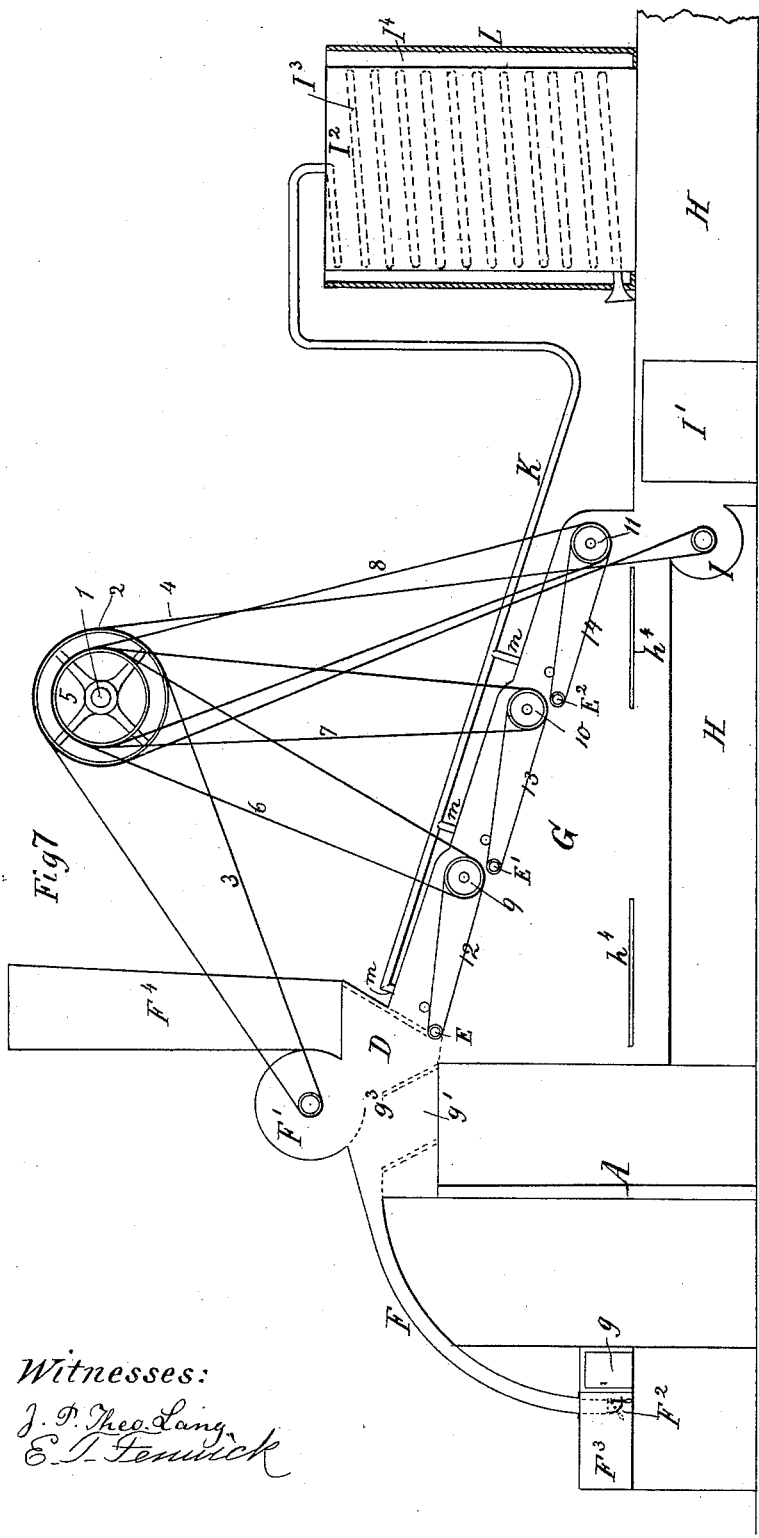
Witnesses:
J. P. Theo Lang
E. T. Fenwick
Inventor:
Charles K. Marshall
by his Attorneys
Mason, Fenwick & Lawrence

UNITED STATES PATENT OFFICE.

CHARLES K. MARSHALL, OF VICKSBURG, ASSIGNOR OF ONE-HALF TO WILLIAM LEWIS NUGENT, OF JACKSON, MISSISSIPPI.

MACHINE FOR REMOVING LINT FROM COTTON-SEED.

SPECIFICATION forming part of Letters Patent No. 431,949, dated July 8, 1890.

Application filed July 8, 1889. Renewed June 16, 1890. Serial No. 355,557. (No model.)

*To all whom it may concern:*

Be it known that I, CHARLES K. MARSHALL, a citizen of the United States, residing at Vicksburg, in the county of Warren and State of Mississippi, have invented certain new and useful Improvements in Machines for Removing Lint from Cotton-Seed; and I do hereby declare the following to be a full, clear, and exact description of the invention, such as will enable others skilled in the art to which it appertains to make and use the same.

My invention relates to machines which remove lint from cotton-seed by attrition or a rubbing and scouring action; and it consists in certain novel constructions, combinations, and arrangements of mechanical appliances in a cotton-seed "delinter," as will be hereinafter described, and specifically claimed.

With my machine the cotton-seed can be fed into the hopper by hand and agitated therein, or it can be fed automatically by mechanical appliances, and when fed by the latter means there is no liability of nails, stones, sticks, or other dangerous obstructions entering along with the seed and injuring the rubbing-surfaces. From the hopper the seed are compelled to pass between the rubbing and scouring surfaces, which are of novel formation, and in their passage they are rubbed or scoured without liability of being injured, and while being thus scoured the machinery, cotton-seed, and lint can be subjected to a cooling process, which will prevent the same from getting on fire from the great friction induced, and the cool air thus employed can be utilized as a means for carrying away the removed lint from the seed while the scouring mechanism is discharging the cleaned seed from the machine.

In the accompanying drawings, Figure 1 is a vertical longitudinal section of my improved cotton-seed delinter as arranged for having the seed fed into the hopper by a shovel and agitated by a spiked wheel. Fig. 2 is a transverse section in the line $x$ $x$ of Fig. 1, showing a portion of the machine and illustrating one of the wire-screen beds mounted on springs. Fig. 3 is a longitudinal sectional view of a portion of one of the endless scourers on an enlarged scale. Fig. 4 is a longitudinal sectional view of a portion of the machine, illustrating the automatic mechanism that may be employed for feeding the seed to the hopper. Figs. 5, 6, and 6* are plan views and a cross-section in perspective, illustrating different styles of irregular scouring-surfaces and a woven angular wire-screen. Fig. 7 is a side elevation of the machine complete, illustrating one mode of driving the different parts.

A in the drawings is the frame-work of the machine, and B B' B² are inclined scouring sieves or screens arranged on successively lower inclined planes. These screens are respectively formed of wire $b$, which is square or angular in cross-section, in order to present sharp angles to the cotton-seeds during their passage over the screen. The angular or square wires are secured upon a strong adjustable foundation frame $a$, which is slotted at $a^6$, so as to move over guide-pins $a^7$, and stayed by spaced longitudinal and transverse pieces, and mounted, preferably, in the frame A upon stout springs $a'$, resting upon adjustable pieces $a^2$, mounted on screws $a^3$, so that the screen may have a chance to yield downward to a slight extent whenever a bunching or clogging of the seed occurs, and whereby, also, the screen-supports are raised or lowered for proper operation. The respective screens are placed a short distance apart and connected with one another by solid aprons $c$, and at the last screen a discharging tail-board $c'$ is provided. Above each of the screens, on ordinary guiding-ledges $a^5$ of the frame, endless revolving rubbers or scourers C C' C² are arranged, so that a space exists sufficient for the passage of the seed between these scourers and the scouring-screens. These endless rubbers or scourers are formed of revolving rollers $d$, endless bands $d'$, and long broad slats $d^2$, the latter riveted or otherwise suitably securely fastened to the belts or bands along one edge, as shown. The top surfaces of the respective slats are covered with vulcanized india-rubber strips $d^3$, suitably fastened to the slats, and the india-rubber on top may be indented with cells of either diamond or zigzag formation, (see Fig. 5,) the indentations being of sufficient size to allow the seed to become partially embedded in the india-rubber, or a portion of the slats may have metallic plates with rasp-shaped projections $d^4$, Fig. 5, applied to them, or longitudinal ribs $d^5$, Fig. 5, may be formed on their india-rubber-covered surfaces $d^3$, and another portion may have bristles, forming brushes $d^6$, set into them, so that the seed may be alternately scoured or rubbed with cellular or irregular india-rubber surfaces and rasping-plates, or with a combination of such surfaces and projecting india-rubber surfaces, and scoured or polished with brushes. The india-rubber scouring or rubbing surfaces create great friction and tumble the seed about and yield to the passage downward of the seed over the screens, and by the joint action of the india-rubber or metal rasping, india-rubber and brush scouring-surfaces, and the angular wires of the screens the lint will be removed from the cotton-seed in the most effective and perfect manner.

In Fig. 6 I have illustrated a plate with projections $d^4$, forming a rubbing-rasp, placed in a screen-frame partly filled with woven, square or angular wires, thus providing for increasing the amount of friction-surface below the upper scouring-surface, if this should be found necessary. The surface of plate $b'$, Fig. 6, may be changed to diamond, zigzag, or straight raised projections or formed of bristles, as found most advantageous, and said portion $b'$ may be slitted or perforated, so as to allow lint and air to pass through it. Slits or perforations $d^{97}$, similar to those just proposed for the screens, may be provided in the slats and rubbing-surfaces thereof for the purpose of allowing the cooling-air to pass more freely to the scouring-surfaces.

D is a hopper for receiving the seed to be operated upon, and, as shown in Fig. 1, this hopper may have a spiked agitator $f$, for agitating the seed.

E E' E² are small revolving brushes placed at the upper ends of the respective scouring-sections for the purpose of forcing the seed between the endless scourers and the screens.

In Fig. 4 the hopper is shown deprived of the spiked agitator and provided with an automatic feed consisting of a fan-spout F, having a suction-fan F', and an adjustable supply-controlling valve F², hinged thereto at its lower extremity, said spout being connected with the hopper, and therefrom carried down and connected with a seed-supply bin or receptacle F³. At intervals along the spout passages $g^2 g^3$, leading into pockets $g g'$, are formed, into which nails, sticks, stones, and other substances liable to injure the rubbing or scouring surfaces are allowed by reason of their superior specific gravity to fall, and thus are kept from passing into the hopper and machine along with the seed, which, owing to their lesser specific gravity, are fed or drawn up and forced into the hopper by the suction-fan F', whereupon they descend to a point to be carried by the scouring-brushes to the scouring-surfaces, while the air escapes through the vertical upper extension F⁴ of the fan-spout.

G is an air-tight casing inclosing the screens and endless scouring-surfaces, and also the frame-timbers A. This casing is divided into several chute-compartments $h h' h^2$ below the screens, these chute-compartments being provided with either valves $h^3$ or slides $h^4$, whereby the suction of the fan I can be partially or wholly cut off from the screens, and they connect with a long spout H, provided with a suction-fan I and leading into a suitable lint-receptacle beyond the fan I. The spout or trunk may have a door I' for access to the fan, as shown.

K is a pipe for conducting cooling-air into the casing G. This pipe has branches $m$, leading into the casing G at points where the seeds are received and delivered from one endless scouring belt or chain to another.

L represents one mode of cooling the air which is drawn into the casing G by the fan I. (See Fig. 7.) In this illustration an ice-box I², inclosing a coil of pipe I³, is arranged as shown, said box being inclosed by a chamber I⁴ for water or air, and the air in passing through the coil of pipe being cooled on its way to the casing G.

Instead of the cooling apparatus represented, an ordinary air-compressor or an ordinary ammonia refrigerating apparatus, may be adopted, the air-compressor or the ammonia refrigerating apparatus being connected with the pipe K. When the compressor is used, the compressed air, after entering into the casing G, expands and absorbs a portion of the undue amount of heat, and thereby prevents the cotton and machinery getting on fire.

I make no claim for the special means employed for cooling the air or for compressing the air.

It will be seen from Fig. 7 that the cooled or compressed air is caused to pass into the casing G by the suction of the fan I, and that after cooling the rubbing-surfaces, cotton-seed, and lint it is drawn forcibly through the wire screens, carrying along with it, through the fan trunk or spout, the lint removed from the seed and depositing the same into a lint-receptacle or a room beyond the fan. In said Fig. 7 I have shown one mode of driving the different endless scouring chains or belts and the fans. In this illustration on a shaft 1 a large pulley 2, having a straight fan-driving belt 3 and a crossed fan-driving belt 4, is shown, and another driving-pulley 5 on the same shaft with the pulley 2 and having belts 6, 7, and 8 extending down to pulleys 9, 10, and 11 on the shafts of the endless rubbing and scouring belts or chains is also shown, and the respective driven rollers of the respective endless rubbing and scouring belts being shown connected to pulleys on the shafts of the revolving brushes by belts 12, 13, and 14, which belts drive said brushes with great speed.

The screens, formed of square or angular wire, may be woven, as illustrated by Fig. 6*, with the wires crossing one another at right angles or diagonally, the same as ordinary round-wire screens are woven.

I would state that while I regard the angular wire an essential feature of my invention in a cotton-seed delinter, I do not confine my other novel features of invention to screens formed of such wire, as such features of invention will produce very useful results with lower rubbing or scouring screens formed of round wire and the like.

In the organization of my machine the greatest advantage will be secured by employing two or more endless rubbing and scouring belts or chains set some distance forward of one another and on successively-lower inclined planes, for by this arrangement the cotton-seed and lint will drop down from one belt upon another and be cooled in free spaces between the respective endless rubbing and scouring belts. This arrangement of short inclined belts avoids much of the great friction due to driving one long belt, extending from end to end of the machine.

Another advantage will be secured from the wires of the screens being set to present square angles or corners to the scouring-surfaces of the endless belts or chains, and by making the said scouring-surfaces of vulcanized india-rubber with numerous cellular depressions of diamond or zigzag form a greater amount of scouring-surface will be secured in a given area than from any other form, and the combination of brushes and rasping surfaces at intervals along the endless scouring-belts insures a very successful removal of the lint from the seed. The difficulty arising from nails, sticks, and stones being carried into the hopper being avoided by the automatic feeder shown in Fig. 4, a great loss from injury to the machine from such obstructions is avoided. The machine being kept from getting on fire by passing the cooling-air through it, great damage from the machinery being set on fire is avoided, and by carrying away the lint by the same air that is used for cooling the machine simplicity of construction is secured and perfection of the operation of having the seed and lint separated when discharged from the machine effected.

What I claim is—

1. In a cotton-seed delinter, in combination, a stationary rubbing or scouring screen formed of angular wire, and an upper movable scourer or rubber, substantially as described.

2. In a cotton-seed delinter, in combination, a feed-hopper, one or more inclined slatted endless rubbing and scouring belts having irregularly-surfaced india-rubber facings applied to their slats, and one or more inclined screens formed of angular wire, substantially as described.

3. In a cotton-seed delinter, in combination, a feed-hopper, an inclined slatted endless rubbing and scouring belt having irregularly-surfaced facings of india-rubber and an inclined screen formed of angular wire, and a brush for forcing the cotton-seed between the scouring-surfaces, substantially as described.

4. In a cotton-seed delinter, in combination, a feed-hopper, an inclined slatted endless rubbing and scouring belt having irregularly-surfaced india-rubber facings and brushes applied to its slats, and an inclined screen formed of angular wire, substantially as described.

5. In a delinter, in combination, a hopper, an inclined slatted endless belt having irregularly-surfaced india-rubber facings and brushes applied to its slats, an inclined screen formed of angular wire, and a brush for forcing the seed between the scouring-surfaces, substantially as described.

6. In a delinter, in combination, a hopper, two or more slatted endless rubbing and scouring belts having irregularly-surfaced india-rubber and brush facings and placed on successively lower inclined planes, and two or more screens set on successively lower inclined planes and connected by inclined aprons, substantially as described.

7. In a cotton-seed delinter, in combination, a hopper, two or more slatted endless rubbing and scouring belts having irregularly-surfaced india-rubber and brush facings and placed on successively lower inclined planes and two or more screens set on successively lower inclined planes and connected by inclined aprons, and two or more brushes for forcing seed between the scouring-surfaces, substantially as described.

8. In a cotton-seed delinter, in combination, one or more slatted endless rubbing and scouring belts, one or more inclined screens, an air-tight casing, an air-pipe, one or more air-chutes, an air-trunk, and a suction-fan, substantially as described.

9. In a cotton-seed delinter wherein the delinted seed and lint are discharged separately, the combination of the cotton-seed-scouring mechanism comprising screens and endless slatted rubbing and scouring belts, as described, an air-tight casing having an air-supply pipe in communication with the casing above the screens of said mechanism, and a suction-fan having a trunk below the said scouring mechanism in communication with the casing only through the lint-escape passages of the screens of said mechanism, whereby cooling-air is supplied to the scouring mechanism and only the lint is drawn down through said screens by and along with said air, substantially as described.

10. In a cotton-seed delinter, in combination, the inclined slatted endless scouring belts having slats with irregularly-surfaced india-rubber facings and brushes, in combination with inclined screens formed partly of wire and partly of irregularly-surfaced scouring-plates, substantially as described.

11. In a cotton-seed delinter, in combination, a hopper, cotton-seed rubbing and scouring mechanism, a revolving device at the throat of the hopper for causing the seed to pass between the scouring mechanism, and the automatic feed consisting of a suction-fan $F'$ and its air trunk or spout $F$, having a valve $F^2$ and extension $F^4$ at its upper end, substantially as described.

12. In a cotton-seed delinter, in combination, a hopper, cotton-seed rubbing and scouring mechanism, a revolving device at the throat of the hopper for causing the seed to pass between the scouring mechanism, and the automatic feed consisting of a suction-fan $F'$ and its air trunk or spout $F$, provided with a valve $F^2$, extension $f^4$ at its top, and provided with one or more openings, as $g^2$ $g^3$, leading into one or more pockets, as $g$ $g'$, for receiving nails, sticks, and stones, said pockets being between the seed-bin and the feed-hopper, substantially as described.

13. The combination of the slatted endless cotton-seed-scouring belts and inclined screens mounted upon springs, substantially as described.

14. The combination of the slatted endless cotton-seed-scouring belts, inclined screens mounted upon slotted supports, springs, and adjusting-screws, substantially as described.

15. In a cotton-seed delinter, in combination, means for scouring the seed, an air-tight chamber, an air-pipe connected with said chamber, an air-cooling apparatus, and a suction-fan for drawing the air from the said chamber, substantially as described.

16. In a cotton-seed delinter, in combination, means for scouring the seed, an air-tight chamber, an air-pipe connecting with said chamber, an air-cooling apparatus, a suction-fan for drawing the air from said chamber, an automatic feed consisting of a suction-fan and its air-trunk, a hopper, and a revolving brush at the throat of said hopper for causing the seed to pass between the scouring-surfaces, substantially as described.

In testimony whereof I hereunto affix my signature in presence of two witnesses.

CHARLES K. MARSHALL.

Witnesses:
E. T. FENWICK,
JOS. W. DENEANE.